Figure 1:
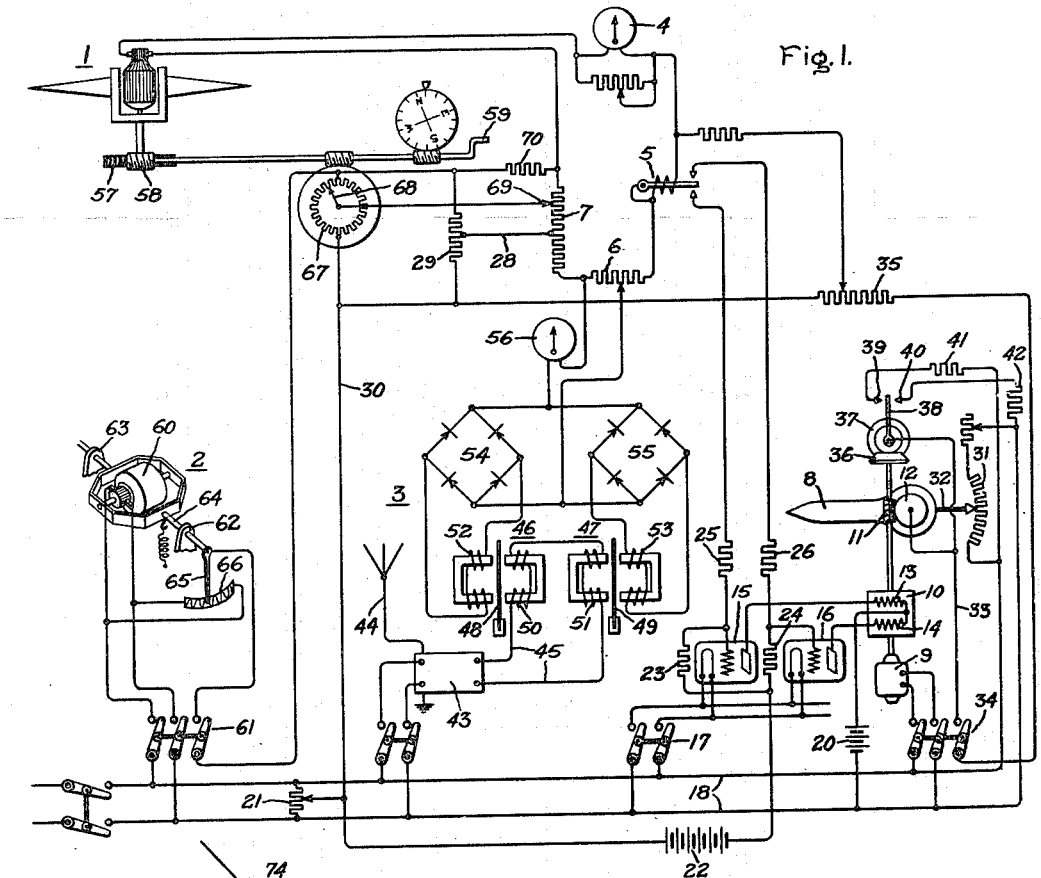

May 8, 1934.  E. F. W. ALEXANDERSON  1,958,258

AUTOMATIC STEERING SYSTEM

Filed July 15, 1931

Inventor:
Ernst F. W. Alexanderson,
by Charles E. Jullar,
His Attorney.

Patented May 8, 1934

1,958,258

UNITED STATES PATENT OFFICE 1,958,258

AUTOMATIC STEERING SYSTEM

Ernst F. W. Alexanderson, Schenectady, N. Y., assignor to General Electric Company, a corporation of New York Application July 15, 1931, Serial No. 550,974

11 Claims. (Cl. 172—282)

My invention relates to automatic steering of moving craft and it has for one of its objects to provide means whereby moving craft, such as air or water craft, may be maintained upon a predetermined course notwithstanding the tendency of external forces such as wind, or water currents, to cause the craft to depart from the course.

A number of different systems have been devised whereby moving craft are automatically guided along a straight course, as along a course having a direction determined with reference to the direction of the earth's magnetic field. While craft may be very satisfactorily guided in a predetermined direction by a system of this type, it is desirable in order to overcome the effects of drift that the course should be determined by reference to a particular point such as the destination of the craft. That is, if a craft, attempting to follow a predetermined straight course leading to its destination but which is determined only by reference to a certain direction, as by reference to the direction of the earth's magnetic field, drifts from the course due to wind without change in the direction of the fore and aft line of the craft, it is obvious that it will miss its destination. Accordingly it is desirable that means be provided to alter the direction of the fore and aft line of the craft when it deviates from its course in such a way as to return the craft to the course which when followed in the predetermined direction leads to the point of destination.

Accordingly, an object of my invention is to provide means whereby the craft is steered both by reference to a particular direction and also by reference to a fixed point upon the earth such as the destination of the craft.

Thus in accordance with my invention means are provided whereby a course leading to the point of destination of the craft is marked out to the craft by means of radio, as by a radio beacon. This may be accomplished by one of the well known methods, as for example, by means of the equi-signal method in which waves having predetermined distinctive characteristics are transmitted directly on opposite sides of the course to be followed and in such a way that these waves have equal intensity along the course to be followed but are of unequal intensity on either side of the course. Thus, by means of radio equipment provided on the craft two distinctive effects may be produced dependent upon the side of the course to which the craft deviates. Such a beacon system is shown and described in the Proceedings of the Institute of Radio Engineers, Vol. 16, 1928, pp. 890 to 920. In accordance with my invention these effects are utilized to control the rudder of the craft to cause it to return to the course leading to the destination.

It will, of course, be apparent that the craft may be steered in response to radio alone and along a course leading to the destination. An object of my invention, however, is to provide means whereby the craft is steered in a manner determined by the combined effects produced by a direction sensitive apparatus, such as a magnetic compass and by radio, whereby the craft is steered not only by reference to direction but also by reference to a fixed point upon the earth. Thus, in this way if the craft is on its true course but is turned for any reason from its course, the direction sensitive apparatus is effective to return it to its true direction with reference to the earth's magnetic field. If it is off its true course but its fore and aft line extends in the proper direction with reference to the earth's magnetic field, the radio effect serves to return the craft to its true course.

Thus, an object of my invention is to introduce an effect produced by radio into the system whereby the craft is steered along a straight course in such a way that the action of that system is modified to compensate for any tendency of the craft to deviate from its true course.

Figure 2:
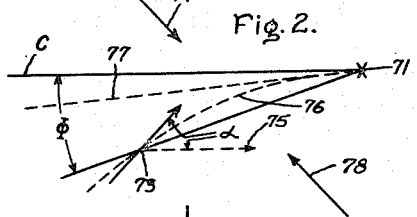
Figure 3:
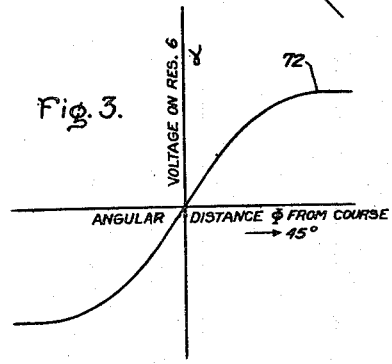
Figure 4:
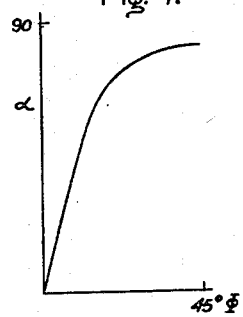

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention and Figs. 2, 3 and 4 represent certain characteristics with reference to its operation.

Referring to Fig. 1 of the drawing, I have shown therein three elements through the medium of which the craft is guided, these elements comprising an earth inductor compass 1, a gyroscope 2 and a radio receiving system 3. The output from all of these devices is connected in a series circuit which includes the armature of the earth inductor compass 1, an indicating device 4, the winding of a polarized relay 5 and resistances 6 and 7, the output from the radio receiving system being connected across the portion of the resistance 6 and the output from the gyroscope being connected across a portion of resistance 7. The rudder of the aircraft is indicated at 8 in the drawing and is operated by means of a motor 9 through a suitable magnetic clutching mechanism 10 and a worm 11 and wormwheel 12. The magnetic clutching mechanism may be of any suitable construction, such as that shown in Patent No. 1,169,937 to Dikeman, issued February 1, 1916, for example, and comprises a pair of coils 13 and 14 which are connected respectively with the anode circuits of two vacuum tubes 15 and 16, the grids of which are controlled by means of the opposite contacts on the polarized relay 5. A suitable gear mechanism, not shown, is associated with the clutching mechanism whereby when the coil 13 is energized the worm 11 is rotated in one direction whereas when the coil 14 is energized the worm 11 is rotated in the opposite direction. In this way a rudder 8 may be operated in either direction according to the position of the polarized relay 5.

The cathodes of each of the vacuum tubes 15 and 16 are arranged to be connected by means of a switch 17 to a pair of power supply conductors 18 whereby these cathodes are energized. The anodes are energized from a source of potential 20 which is connected between the lower one of the power supply conductors 18 and a point on the anode circuits of the discharge devices between the coils 13 and 14. A resistance 21 is connected across the conductors 18 thereby to establish a neutral point with reference to the positive and negative terminals of the source. A suitable bias with reference to this neutral point is supplied to the grids of the discharge device 15 and 16 by means of a source of potential 22 having its positive terminal connected to the neutral point on the resistance 21 and its negative terminal connected through resistances 23 and 24 respectively, which are of high value, to the grids of vacuum tubes 15 and 16. The grids of each of the vacuum tubes are also connected through resistances 25 and 26 respectively, which are of relatively low value, to the opposite stationary contacts on the polarized relay 5. The armature of polarized relay 5 is connected to the neutral point on resistance 21 through a circuit which includes resistance 6, the lower portion of resistance 7, conductor 28, the lower portion of resistance 29 and conductor 30.

As thus arranged, when the armature of relay 5 is in its upper position the negative potential on the grid of device 16 is sufficiently reduced to cause current to flow in its anode circuit having a value sufficient to cause energization of winding 14 of the magnetic clutch, thereby to cause movement of the rudder in a certain direction. If the relay 5 is operated to its opposite position current is caused to flow in the anode circuit of the discharge device 15 thereby energizing the winding 13 of the magnetic clutch and the rudder 8 is thus operated in the opposite direction.

The rudder 8 is also provided with a follow-up mechanism comprising a potentiometer 31 which is connected directly across the power supply conductors 18 and a contact 32 cooperating therewith and movable with the rudder 8, this contact being connected through a conductor 33, right-hand contact of switch 34, resistance 35 and conductor 30 to the neutral point on the resistance 21. Thus, any movement of the rudder 8 in response to operation of the polarized relay causes an electromotive force to be produced across the resistance 35. One terminal of relay 5 is connected to a point on resistance 35 such that a portion of the electromotive force thus produced on resistance 35 is supplied back to the circuit of relay 5 in such a direction as to neutralize the current which caused actuation of the relay. To secure more rapid action of the follow up device the shaft on the worm 11 is shown as provided with a friction bevel gear 36, which cooperates with a second friction gear 37, the gear 37 carrying a contact 38 which cooperates with two oppositely placed stationary contacts 39 and 40. The contacts 39 and 40 are connected through resistances 41 and 42 of suitable value in the opposite power supply conductors 18 and the movable contact 38 is connected to the conductor 33. Thus, upon movement of the rudder 8 in one direction the contact 38 engages contact 40 thereby supplying a voltage through resistance 35 to the circuit of relay 5 to deenergize that relay. Similarly, if the rudder is moved in the opposite direction, then the contact 38 engages the contact 39 thereby supplying a voltage of opposite polarity to the circuit of relay 5 to deenergize the relay.

The resistances 41 and 42 connected in series with contacts 39 and 40 respectively are of such high value that the electromotive force introduced into the circuit of relay 5 by action of contact 38 corresponds to that which is introduced by movement of contact 32 through a very small angle. It is sufficient to deenergize relay 5 only when the angle of the craft with reference to the compass course is small or when the craft is near the beacon course. Thus, if the craft is far off the course, or the angle with reference to the course is large, the rudder will continue to operate to a point such that the voltage supplied back to the relay circuit from potentiometer 31 is sufficient to neutralize the output from the compass or radio equipment, as the case may be, and thereby deenergize relay 5. Were it not for the contacts 38, 39 and 40, however, due to the mechanical inertia of the moving parts the rudder would tend to overshoot, thereby causing a certain amount of oversteering of the craft. These contacts on the other hand have the effect of tending to cause understeering of the craft. The resultant effect of these contacts, taken together with the inertia of the moving parts, is to produce substantially accurate steering in response to the compass and radio voltages.

The radio receiving equipment which is shown in the drawing is one adapted for operation in connection with a beacon system in which high frequency oscillations modulated with different low frequencies are transmitted directively on opposite sides of the course to be followed by the craft. Thus the system comprises any suitable radio frequency amplifying and detecting system which I have indicated by the rectangle 43 to which high frequency oscillations are supplied by means of the receiving antenna 44 and from which audio frequency currents which are produced by the demodulation of the received oscillations are supplied to an output circuit 45. Associated with the output circuit 45 are a pair of electromechanical filters 46 and 47 each of which comprises a vibrating reed having a natural period of vibration. The vibrating reed 48 of the filter 46 has a natural period corresponding to the frequency of modulation of the oscillations transmitted on one side of the course and the natural frequency of the reed 49 of filter 47 corresponds with the frequency of modulation of the oscillations which are transmitted on the opposite side of the course. Each of these filters comprises an exciting magnet having a winding 50 and 51, wound on permanently magnetized cores, and connected in the output circuit 45 and also an opposite winding 52 and 53, also wound on permanently magnetized cores, and in which electromotive forces having a frequency equal to the natural frequency of the respective reed 48 and 49, are induced by vibration of the reed. The voltages induced in the windings 52 and 53 are rectified by means of rectifiers 54 and 55. These rectifiers may be of any suitable construction but preferably are of the type shown in Patent No. 1,640,335 to Lars O. Grondahl, issued August 23, 1927. The rectified voltages are then supplied with opposite polarities to an indicating device 56 and a portion of resistance 6 in series.

As thus arranged, when the craft is on one side of the course where it receives oscillations which are modulated at a frequency corresponding to the natural period of the reed 48, oscillations of this frequency will be produced in the output circuit 45. The reed 48 responds to this frequency whereas the reed 49 does not. Thus, voltage having a corresponding frequency is set up in the winding 52 and rectified by the rectifier 54 thereby causing a current of a certain polarity to flow in the resistance 6 and the indicating device 56. If the craft is on the opposite side of the course, oscillations modulated with the opposite frequency are received thereby causing the reed 49 to respond and a current of the opposite polarity to flow in the resistance 6 and the indicating device 56. If the craft is on its course, the two frequencies are received with equal intensity and accordingly no voltage is produced across the resistance 6. Thus, the polarized relay 5 is caused to respond when the craft deviates from the course to either side and the indicating device 56 indicates the position of the craft with reference to the course.

The earth inductor compass 1 is shown conventionally in the drawing since any suitable compass may be employed. This compass is provided with a suitable adjusting mechanism comprising a worm wheel 57 and worm gear 58 which is controlled by means of a crank 59 whereby the poles of the magnetic compass may be set at such an angle with reference to the direction of the course to be followed by the craft that no voltage is produced across the armature when the craft proceeds in the proper direction. Thus, when the craft deviates from its course by turning, for example, to the right, a voltage of one polarity is set up across the armature, whereas if the craft deviates from its course by turning to the left, a voltage of opposite polarity is set up across the armature. Thus the relay 5 likewise responds to the earth inductor compass upon any turning of the craft from its course.

Since the gyroscope 2 connected as shown likewise produces voltage across its output only in response to turning of the craft in its course and having a polarity dependent upon the direction of the turn, it too may be utilized to steer the craft along a straight course. In the form of the invention shown in the drawing, however, this gyroscope is utilized to compensate for certain errors which occur in connection with the operation of the compass. The pole pieces of the compass commonly are pendulously stabilized, through means not shown, in the horizontal plane. In response to any turning of the craft these poles deviate from this plane and thus introduce an error, due to the vertical component of the earth's magnetic field, in the value of voltage produced across the armature. The purpose of the gyroscope in the system presently described is to correct this error. Its operation in so correcting this error has been fully described in an article published in the General Electric Review for April 1931 by Dr. J. D. Tear and E. J. Lawton.

The gyroscope comprises a motor 60 which is supplied with power from the power supply conductors 18 through the center and left-hand contacts of a switch 61. This motor rotates at high speed about an axis preferably parallel with the athwart axis of the craft and is arranged by means of supports 62 and 63 to rotate about a shaft 64 which extends parallel with the fore and aft axis of the craft in response to any turning of the craft. Shaft 64 carries a contact member 65 which cooperates with a potentiometer 66 connected across the power supply conductors. This contact is connected through the right-hand blade of switch 61, through a circular resistance 67 and conductor 30 to the neutral point on resistance 21. Thus resistance 21 and potentiometer 66 are connected in bridge relation and voltage is produced across the circular resistance 67 only in response to precession of the gyroscope, as due to turning of the craft. Circular resistance 67, by means of movable contacts 68 and 69, is also connected in bridge relation with a resistance 29 the voltage produced between diagonally opposite points on this bridge i. e. between contact 69 and conductor 28 being supplied to the resistance 7. An additional resistance 70 is connected between the upper terminals of resistances 7 and 29 to introduce a voltage in the circuit of resistance 7 which is proportional to angular velocity but independent of the course setting angle.

Thus, if the craft is proceeding in a northerly direction and turns from its course, the value of voltage produced across the armature of the earth inductor compass includes a certain error due to the vertical component of the earth's magnetic field. This error is in a direction dependent upon the direction of turn of the craft and varies dependent upon the angle of the course with reference to north and the angle of dip of earth's magnetic field at the latitude at which the craft is operated. The voltage produced on resistance 7 by the gyroscope, when the contacts 68 and 69 are properly positioned is sufficient to compensate for this error. The error due to the angle of the course with reference to north is corrected by the position of contact 68 on resistance 67 this adjustment being made automatically in response to the adjustment of the course setting mechanism. The position of contact 69 on resistance 7 may be so adjusted as to compensate for the error due to the latitude at which the craft is operated.

A more complete understanding of the operation of the system may be had by reference to Fig. 2 in which I have indicated the course to be followed by the line C and the destination of the craft by the point 71. Thus, if we assume that by means of a radio beacon located for example at the point 71, or at a suitable point along the course, the course C is marked out to the craft, as by transmitting oscillations modulated with different frequencies on opposite sides of the course as above explained.

The value of the voltage produced on resistance 6 by the radio receiving equipment is indicated by the curve 72 in Fig. 3 where I have plotted the angular distance from the course as abscissa and voltage as ordinates. Thus, if the craft is to be left of the course voltage having a value and polarity in accordance with the left-hand portion of the curve 72 is produced whereas if it is to the right of the course, this voltage has a value and polarity corresponding to the right-hand portion of the curve 72. If we assume therefore that the craft is at a point 73 having drifted off the course, due, for example, to wind having a direction indicated by the arrow 74, but is still headed in a direction parallel with the course as indicated by the arrow 75, then no voltage is produced across the armature of the earth inductor compass or the gyroscope because the direction of movement of the craft is unchanged. The radio receiving equipment, however, responds and produces a voltage across the resistance 6 having a certain polarity. This voltage causes the armature of relay 5 to be operated, for example, to its lower position thereby causing current to flow in the anode circuit of discharge device 15 and energization of the winding 13. Thus, the rudder is caused to move downward, the pointer 32 upward and the contact 38 to the right and into engagement with contact 40. Voltage is thus supplied back through resistance 35 to the circuit of relay 5 causing that relay to return to its initial position. The rudder has been turned, however, through a certain angle with the result that the craft likewise turns through an angle which I have indicated at α. In response to any turning of the craft, however, a certain amount of voltage is produced by the inductor compass which voltage likewise tends to neutralize the voltage produced across the resistance 6 by the radio equipment. Thus, the two voltages coact; the voltage produced by the radio tending to turn the craft in the direction of the course and the voltage produced by the inductor compass tending to maintain the craft in a direction parallel with the course originally set. Thus, in accordance with these voltages the relay 5 is caused to be repeatedly energized and deenergized thereby causing the craft to follow a course determined by the relative magnitude of the voltages set up by the radio equipment and the earth inductor compass. At points relatively distant from the course the voltage produced across resistance 6 by the radio equipment is of relatively large value and accordingly the angle of turn of the craft is likewise relatively large but is determined in magnitude by the ratio of voltage produced by the radio equipment and that produced by the compass in response to the turning of the craft from the course originally set. The radio receiver, however, is such that its output is never so great that the craft is turned through an angle greater than ninety degrees. Preferably, the receiver is equipped with an automatic volume control device such as that shown, for example, in Patent No. 1,675,848 to H. T. Friis, thereby to limit the turning angle produced by the radio equipment when the craft is at large distances from the course. As the craft approaches the course, the voltage produced by the radio equipment gradually diminishes with the result that the voltage produced by the compass and that produced on resistance 35 by the follow-up mechanism predominates, thereby gradually returning the rudder toward the neutral position. Thus, the craft is automatically steered along a curved course which I have indicated at 76 leading to the destination.

In Fig. 4 I have shown a curve indicating the relation between the angle of turn of the craft α plotted as ordinates and the angle φ indicated in Fig. 2, i. e., the angle between the course and a line joining the craft and the beacon, plotted as abscissa. From this curve it will appear that the angle α is always greater than φ but never exceeds 90 degrees. The ratio between α and φ may be adjusted by properly positioning the connection to resistance 6. So long as there is a wind blowing in the direction, as indicated at 74, the craft never reaches the course for which the inductor compass was originally set but attains it within a very small angle which may for example be indicated by the angle between the line C and dotted line 77. If the wind reverses and blows from the opposite direction, for example, as indicated by the arrow 78 then the craft will ultimately cross the course and proceed toward its destination at a corresponding angle on the opposite side of the course. In the absence of wind the craft will attain the course and follow it toward its destination.

While I have shown a particular embodiment of my invention, it will of course be understood that I do not wish to be limited thereto since many modifications both in the circuit arrangement and the instrumentality employed may be made and I contemplate by the appended claims to cover all such modifications as fall within the true spirit and scope of my invention.

What I claim as new and desire to secure by Letters Patent of the United States is:

1. In a steering system for moving craft, the combination of a magnetic compass, means for automatically steering the craft in accordance with a direction determined by said magnetic compass, and means responsive to received radio waves only upon deviation from a predetermined course for controlling said last means thereby to cause the craft to deviate from the direction determined by said magnetic compass in a manner determined by said radio waves.

2. In a steering system for moving craft, a magnetic compass, means responsive to the position of the craft relative to a predetermined course, means for combining the effects produced by said magnetic compass and said means, and means for steering the craft in accordance with the combined effect produced by said last means.

3. The combination in an automatic steering system for moving craft, of means controlled by radio waves for producing an electromotive force having polarity and magnitude dependent upon the position of the craft with reference to a predetermined course, means controlled by the earth's magnetic field for producing an electromotive force having polarity and amplitude dependent upon the direction in which the craft is headed and means for controlling the rudder of the craft in response to the combined effect of said electromotive forces.

4. In a system for automatically steering moving craft, a radio beacon adapted and arranged to transmit radio waves along the course to be followed by the craft, means including an earth inductor compass for steering said craft in a direction parallel with said course to be followed, and means operative responsively to said radio waves when the craft departs from said course automatically to steer the craft toward the course.

5. In a system for automatically steering moving craft, a radio beacon arranged to transmit radio waves having distinctive characteristics on opposite sides of the course to be followed, an earth inductor compass, means responsive to said earth inductor compass for steering the craft along a course parallel with said course and means on the craft operative responsively to the character of said radio waves when the craft departs from the course to control said last means in such a way that the craft is steered toward the course.

6. In a system for automatically steering moving craft, means including an earth inductor compass for automatically steering the craft along a predetermined course, and means responsive to received radio waves when the craft departs from said predetermined course automatically to steer said craft toward the course, and means whereby said two means are simultaneously effective in varying degrees to steer said craft.

7. A steering system for moving craft including means responsive to turning of said craft from a direction parallel to a predetermined course, means responsive to the position of the craft when said craft departs from said predetermined course, and means for steering said craft automatically in accordance with the effects of the responses produced by said means individually, and in combination.

8. A system for automatically steering moving craft including means responsive to changes in direction of said craft, means responsive to the position of said craft relative to a predetermined course, means for combining the effects of the responses of both said means, and means responsive to said last means for automatically steering said craft toward said course.

9. A steering system for moving craft travelling along a radio beacon course including means for producing a response to changes in direction of said craft, means for producing a response to received radio energy of said radio beacon course only when said craft departs from said course, means for combining the effects of the responses, and means for automatically steering said craft toward said course in accordance with the effect produced by said last means.

10. A steering system for guiding moving craft along a radio beacon course comprising means responsive to changes in direction of said craft for developing a voltage having polarity and magnitude dependent upon said change of direction, means responsive to received radio energy of said radio beacon course only when said craft departs from said course for developing a voltage having polarity and magnitude dependent upon the position of said craft with respect to said course, means for combining said voltages, and means responsive to said last means for steering automatically said craft to return said craft toward said radio beacon course.

11. In a system for guiding moving craft along a predetermined course defined by radiant energy of a certain character on one side of the course and radiant energy of a different character on the other side of the course, the combination of direction sensitive means to steer the craft in a direction parallel to said course, means controlled by said radiant energy to steer the craft toward said course in response to departure of the craft therefrom, and means common to said two means whereby the craft is steered by both of said means along a course determined by the relative tendencies of both of said means to steer the craft according to their respective laws of operation.

ERNST F. W. ALEXANDERSON.